United States Patent [19]
Dillon

[11] 3,858,808
[45] Jan. 7, 1975

[54] OXY-ACETYLENE TORCHES

[76] Inventor: Nicholas Thomas Edward Dillon, 10 Murtle Bank Ter., Stonyfell, Australia 5066

[22] Filed: Dec. 26, 1972

[21] Appl. No.: 318,537

[30] Foreign Application Priority Data
Dec. 30, 1971    Australia.............................. 7548/71

[52] U.S. Cl.................. 239/429, 431/354, 239/431
[51] Int. Cl.............................................. B05b 7/06
[58] Field of Search............. 239/416.5, 417, 419.5, 239/425.5, 429–431; 431/354, 355

[56] References Cited
UNITED STATES PATENTS

| | | | |
|---|---|---|---|
| 926,218 | 6/1909 | Smyth et al...................... | 239/427.5 |
| 1,418,245 | 5/1922 | Fouche ............................... | 239/417 |
| 2,450,790 | 10/1948 | Greaves ............................. | 431/355 |
| 2,483,545 | 10/1949 | Johnson ............................. | 239/431 |
| 2,513,523 | 7/1950 | Schafer............................. | 239/419.5 |

FOREIGN PATENTS OR APPLICATIONS
27,086    0/1896    Great Britain...................... 239/430

*Primary Examiner*—Carroll B. Dority, Jr.
*Attorney, Agent, or Firm*—Jay L. Chaskin, Esq.

[57] ABSTRACT

An oxy-acetylene torch attachment which is provided with a mixing chamber extending in a downstream direction from a welding torch hand piece and which terminates in a nozzle, the mixing chamber being long and large in diameter with respect to the hand piece and nozzle aperture sizes and being free of abrupt steps so that gas from the flow through is in nonturbulent streamlines, so that the issuing flame is of high intensity and small area, thereby making it possible to weld oxidizable metals the oxides of which normally prevent welding and further making it possible to weld with a very low gas consumption.

3 Claims, 6 Drawing Figures

PATENTED JAN 7 1975

OXY-ACETYLENE TORCHES

The invention relates to improvements in oxy-acetylene torches, and more specifically to an attachment which is attachable to the hand piece of an oxy-acetylene weld torch.

BACKGROUND OF THE INVENTION

The following prior patents indicate the state of the art:

1. U.S. Pat. No. 1,758,054 Nagy illustrates a welding torch having a pipe with branches entering into it at different points so as to effect a thorough mixing of the oxygen and acetylene. Apart from this, the passage of gases through the hand piece and discharge nozzle is very similar to the passage of gases through the most commonly used welding torches today.
2. U.S. Pat. No. 2,483,545 Johnson discloses a welding torch attachment having air apertures in its side walls so that it may be used for body soldering of automobiles, tinning, sliver-soldering and the like.
3. U.S. Pat. No. 1,276,893 Fischer illustrates a welding torch having helically formed plugs within the hand piece body to provide a tortuous course for the intimate mixture so that there will be a thorough mixing of the gases.
4. U.S. Pat. No. 1,373,829 Perdue illustrates a welding torch provided with an internal "tip" having a series of passages extending around its outer surface so that the "streams of gas flowing through the channels continually collide and mingle with each other".

As disclosed in the above patents numbers (3) and (4), it has previously been thought desirable to continuously deflect gases to achieve thorough mixing. However this type of torch has been replaced largely with a torch of the general type described in reference (1) above wherein a gas passage consists of a smooth elongate tubular wall which converges at the nozzle end of the hand piece. This type of construction is preferred largely because of its great simplicity, and it has been found unnecessary to utilize the mixing arrangements previously proposed. However the gas flame which issues from such a torch has a temperature which is high over a comparatively large area, and it is well known in the art that many metals are difficult to weld with such torches. Thus for example the welding of the most common grades of aluminium has been most difficult to achieve with conventional gas torches, and the present art requires almost universal use of inert arc welding. It is believed that there is a further reason that aluminium is difficult to weld with a torch of the type generally used and similar to that shown in reference (1) above, the further reason being that imperfect mixing of the oxygen and acetylene leaves some oxygen in the gas flame available for oxidizing the aluminium.

The main object of this invention is to provide a gas torch attachment which is attachable to the hand piece of a gas torch wherein the flame achieved will have a very high temperature over a relatively small area and will be surrounded by a flame having a minimum of gas turbulence. Such a flame has the advantages that firstly the weld areas only of the work pieces are subject to very high temperature and secondly that oxidation can be substantially reduced. Surprisingly we have also found that effective welding can take place with a greatly reduced consumption of gases.

A further object of this invention is to provide a gas flame of such form and such concentration of heat that some welding operations can take place with little or no oxygen, but utilizing mostly or entirely air for the oxygen supply for combustion of the acetylene, and higher useful temperatures can be achieved than with the proposed attachment illustrated in reference (2) above.

BRIEF SUMMARY OF THE INVENTION

Briefly the invention includes an oxy-acetylene torch attachment which can be engaged over the outer surface of the hand piece bend of a welding torch, the attachment comprising an adaptor with a mixing chamber extending from the hand piece to a nozzle at the discharge end of the mixing chamber, the length of the mixing chamber being at least eight times its diameter and the mixing chamber diameter being at least three times the aperture diameter of either the hand piece bend or the nozzle, and the chamber and nozzle walls being free of abrupt steps so that gas flow therethrough is in non-turbulent streamlines.

It has been found that, contrary to previously held opinion, passing the gas through an elongate chamber which has walls which allow the gas flow to take place in streamlines after the gas has been mixed ensures a small diameter high temperature flame center surrounded by a substantially non-turbulent combustion area of gas flame which is so effective that in many instances high temperature brazing and even low temperature welding can take place utilizing air instead of oxygen to provide the combustion gases for the acetylene. Surprisingly also, it is found that the flame can be useful when it is slightly reducing and in heating only the weld areas, will not oxidize difficult metals such as aluminium. With this invention it is possible for an unskilled or semi-skilled welder to weld the common grades of aluminium which would otherwise be difficult for even the highly skilled operator.

Still further surprisingly, it is found that the gas consumption can be reduced to a small fraction of that used with the previously proposed devices referred to in the patents above.

More specifically, the invention may be defined briefly as consisting of an oxy-acetylene torch attachment comprising a tubular adaptor having an inner bore of such diameter as to engage over the outer surface of a hand piece bend of a welding torch, tubular means having a cylindrical wall of constant diameter throughout its lenth defining a mixing chamber extending in a downstream direction from the adaptor and terminating in a nozzle at the discharge end of the mixing chamber, the length of the mixing chamber being at least eight times its diameter, and said mixing chamber diameter being at least three times the aperture diameter of the hand piece bend and also at least three times the aperture diameter of the nozzle, the chamber and nozzle walls being free of abrupt steps so that gas flow therethrough is in non-turbulent streamlines. It will be noted that when utilized as an oxy-acetylene torch for ordinary purposes, the oxygen and acetylene is allowed to expand and move in a streamline fashion after its initial mixing within the hand piece of the welding torch and before being ignited.

Figures 1, 2:
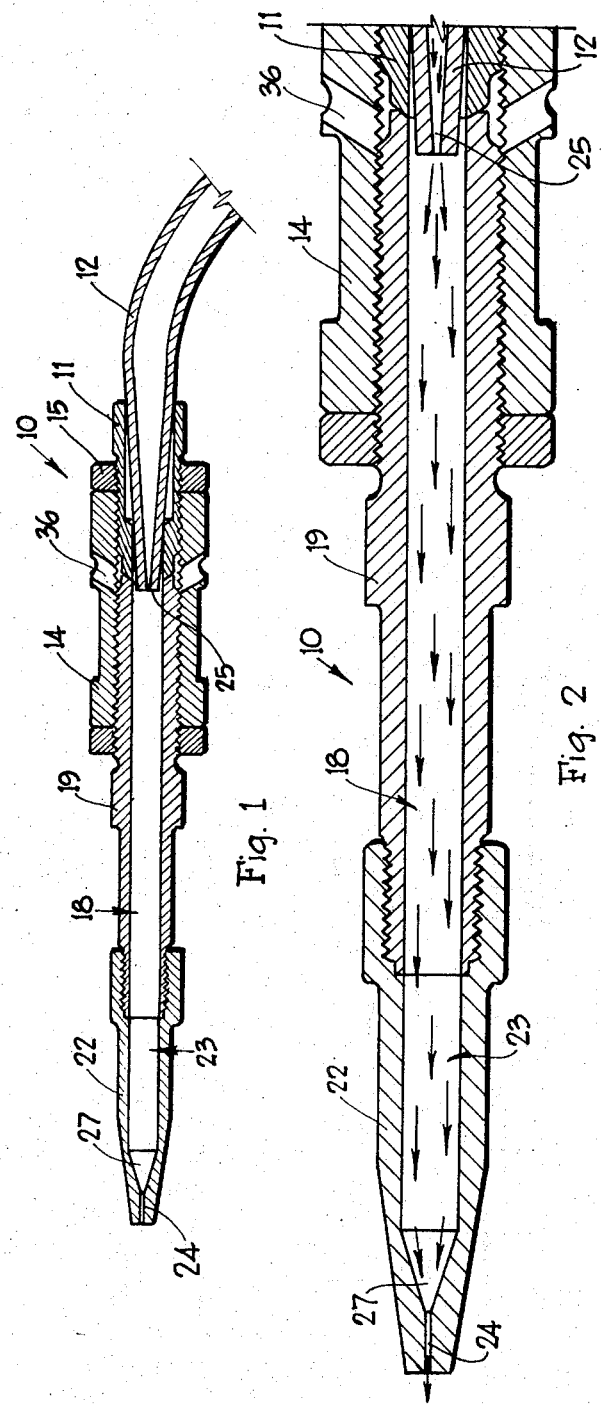
FIG. 1 shows an attachment fixed to the hand piece bend of an oxy-acetylene torch, FIG. 1 being an elevational section, the hand piece bend being partially shown in dotted lines.
FIG. 2 is a fragmentary section as shown in FIG. 1 but to an enlarged scale so as to illustrate gas flow.
Figure 4:
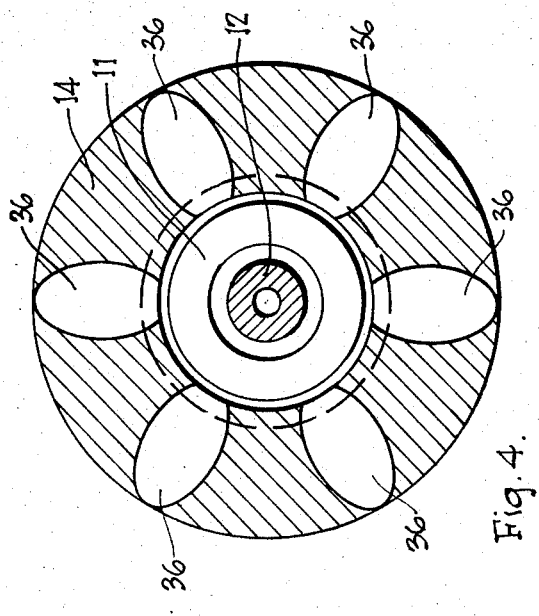
FIG. 4 is a cross section taken on line 4—4 of FIG. 3.

Referring first to the embodiment of FIGS. 1, 2, 3 and 4, an oxy-acetylene torch attachment 10 is provided with a screw threaded adaptor 11 which frictionally engages over the tapered outer wall of a hand piece welding torch 12 of known type. The hand piece welding torch 12 is partially illustrated to indicate that it does not form portion of the invention.

The adaptor 11 threadably engages a threaded bore of a hollow body 14, and the adaptor 11 has on it a lock nut 15 so that it can be retained in any position selected by an operator. The downstream end of the adaptor 11 is designated 16 and is of frusto conical shape. This is best seen in FIG. 3.

A mixing chamber is designated 18 and is defined by the walls of a threaded tubular member 19 which also threadably engages the threaded bore of the hollow body 14 but from the downstream end thereof, the upstream end of the tubular member 19 being designated 20 (FIG. 3) and complementary in shape to the downstream end 16 of the adaptor 11 and is so arranged that upon screwing together a substantially gas tight joint is achieved. The downward end of the tubular member 19 is threadably engaged by a nozzle 22, the nozzle 22 having an inner bore 23 of exactly the same diameter as the inner bore of the mixing chamber 18, the nozzle 22 having an aperture 24 at its downstream end, the aperture 24 being of approximately the same diameter as the aperture 25 of the hand piece bend 12. However between the inner bore 23 and the aperture 24 there is a frusto conical inner wall designated 27 having a very small acute included angle so that the gas flow issuing from the aperture 25 of the hand piece bend 12 extends through the mixing chamber 18, through the inner bore 23 and the frusto conical wall portion 27 to discharge through the aperture 24 without passing any abrupt changes in diameter and shape, the streamlines formed by the already mixed gases passing outwardly from the hand piece welding torch 12 therefore being substantially non-turbulent. In this respect it will be noted that this invention strives to avoid turbulence whereas much of the prior art strives to achieve turbulence for mixing purposes.

Figure 6:
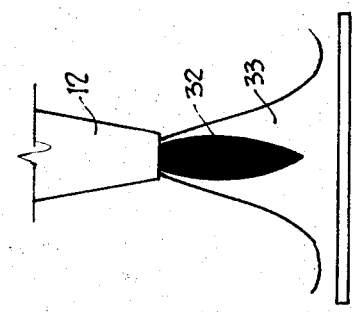
FIG. 6 shows by way of comparison a flame issuing from an ordinary hand piece bend as illustrated in the drawings and without the attachment, FIG. 6 also showing graphically the temperature dispersion of the flame.
Figure 6:
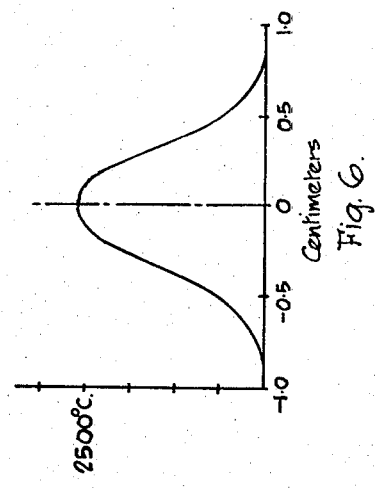
Figure 5:
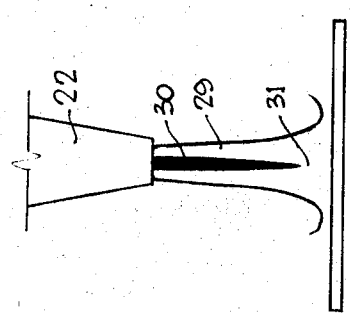
FIG. 5 illustrates a flame as it issues from the nozzle of the attachment, FIG. 5 also showing in graphical form the temperature of the flame and its displacement from the axis of the nozzle.
Figure 5:
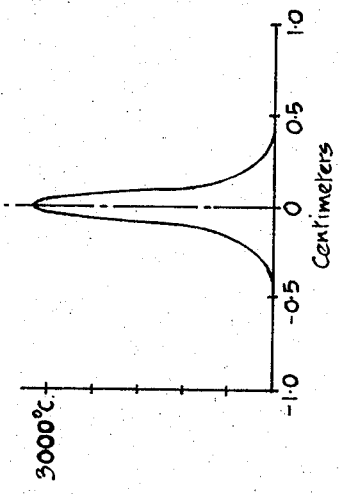

As shown in FIG. 5, (with the nozzle attached) the gas flame designated 29 has a long thin and clearly defined inner cone 30 (with an extension of clear high temperature of gases of combustion) surrounded by an outer envelope of streamer flame 31, which produces a high temperature high intensity low area heat pattern which is illustrated graphically also in FIG. 5. This is compared with the comparatively rough inner cone 32 of short length but large diameter when the hand piece 12 is used without the attachment, and the rough inner cone 32 is surrounded by a relatively large diameter envelope 33. A study of the graphical representation in FIG. 6 will indicate that the heat pattern is of lower temperature and larger diameter than achieved in FIG. 5.

Figure 3:
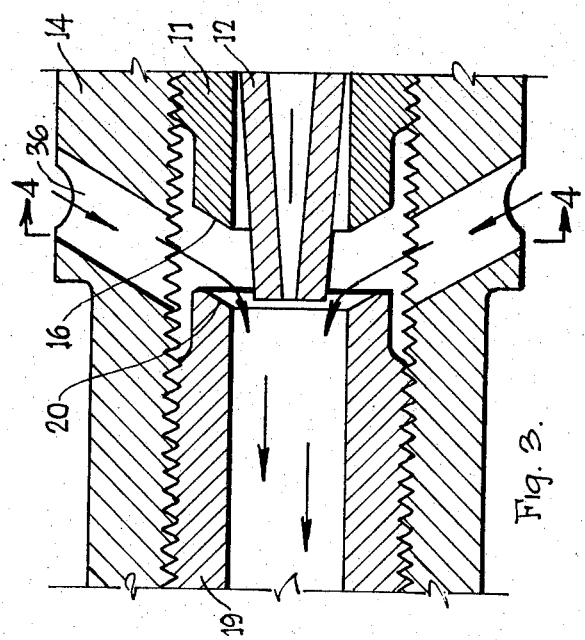
FIG. 3 is a further fragmentary section to a still further enlarged scale to illustrate the arrangement when oxygen is replaced by air.

The attachment has been found to be so efficient that in many cases the oxygen can be either eliminated or substantially reduced by screwing the adaptor 11 and tubular member 19 apart from one another as shown in FIG. 3, and by removing nozzle 22. Sufficient ingress of air through the forwardly sloping air apertures 36 occurs to enable low temperature brazing to take place, but it is necessary for the nozzle 22 to be removed, the flame occurring where the gas issues from the tubular member 19.

In oxy welding, perfect combustion conditions will exist if oxygen and acetylene are mixed in a 5 to 2 ratio volumetrically, but the most commonly used ratio is between 3 and 4 volumes of oxygen to 2 volumes of acetylene, indicating that some of the envelope flame draws its oxygen for combustion from the air, entrained by the moving gases. When this air is mixed with the envelope flame, oxidation of the work piece can take place, and it is believed from the results of our experiments that it is the heated air in and around the envelope flame which is responsible for oxidizing metals such as aluminum. On the other hand with this invention we have been able to weld the common grades of aluminum with a minimum of flux and a very small quantity of gas, since the slow moving small diameter flame entrains less air.

Owing to the more efficient combustion of gas, much less gas is used when this attachment is employed. In one test which was supervised by Peter Linden Harrison, B.E., of Ellis Avenue, Eden Hills, South Australia, identical welding speeds were achieved with the attachment utilizing 4 cubic feet of acetylene and 3.6 cubic feet of oxygen per hour as were achieved with a standard hand piece welding torch 12 utilizing 19 cubic feet of acetylene and 38 cubic feet of oxygen per hour. Thus it will be seen that the invention provides quite remarkable results both for the quality of weld which can be achieved and for gas consumption.

It will be obvious to those skilled in the art that various modifications, changes and equivalents may be made and used in the present invention. The scope of the invention is therefore to be determined by the appended claims.

What I claim is:

1. An oxy-acetylene torch attachment comprising a tubular adaptor having an inner bore of such diameter as to engage over the outer surface of the hand piece bend of a welding torch, a tubular member having a cylindrical wall defining a mixing chamber extending in a downstream direction from the adaptor and terminating in a nozzle at the discharge end of the mixing chamber, a hollow body having a threaded bore, the adaptor and tubular member each having a thread on its outer surface threadably engaging said threaded bore, the downstream end of said adaptor terminating in a frusto conical shape which converges in a downstream direction, the upstream end of said tubular member also terminating in a frusto conical shape which is complementary to said adaptor end, there being a plurality of air inlet apertures spaced circumferentially around the hollow body and extending inwardly through the walls of the hollow body to terminate at their inner ends in said threaded bore at the locality of said frusto conical tubular member and adaptor ends, said air inlet apertures sloping in a downstream direction as they extend radially inwardly.

2. An oxy-acetylene torch attachment according to claim 1 wherein said nozzle threadably engages the downstream end of the tubular member has a bore of the same diameter as the mixing chamber, an outlet aperture, and a frusto conical wall defining an acute cone angle extending between said bore and outlet aperture.

3. An oxy-acetylene torch attachment according to claim 1, wherein said nozzle threadably and releasably engages the downstream end of said tubular member.

* * * * *